Patented Oct. 24, 1922.

1,432,937

UNITED STATES PATENT OFFICE.

WILLIAM H. WOOD, OF CLEVELAND, OHIO.

STORAGE BATTERY.

No Drawing. Application filed January 22, 1920. Serial No. 353,327.

*To all whom it may concern:*

Be it known that I, WILLIAM H. WOOD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries and has for its object the production of a battery which is more susceptible to chemical action and less to harmful physical action than heretofore; the provision of a battery which shall be less subject to injury by overcharging or sulphating; the provision of a battery which shall be capable of a more immediate and prolonged development of its electrical output than other batteries; the provision of a battery which shall develop a larger electrical capacity (both volume and quantity) per unit of size and weight than heretofore; which shall be susceptible to a higher charging and discharging rate than other batteries; while further objects and advantages will appear as the description proceeds.

The invention concerns particularly the paste or oxide type of battery and its essence resides in making the active material or paste porous so that the electrolyte has access to the internal parts thereof as well as to the outer face; and this I do by mixing with the paste prior to its application to the grids or plates a substance which is soluble in whole or in part in sulphuric acid and which shall not, either before or after solution, injure the battery or possess any deleterious chemical or electrical action. It is desirable that the substance employed be insoluble in water and necessary that it be free from chemical substances which have an injurious effect on batteries, especially halogen compounds. It is my present preference to employ a substance which will dissolve completely in the sulphuric acid with which the plate is treated prior to the final assembling of the battery, but I have found no injurious effects from incomplete solution or from the use of a pore-producing substance which shall have a wick-like or capillary structure instead of one which dissolves entirely.

According to my invention I impregnate the paste or at least the working surface thereof with a carbohydrate which is insoluble in water but soluble without decomposition in sulphuric acid, preferably a substance consisting essentially of or containing cellulose or a compound thereof. When this is made from wood scraps or chips I preferably treat it chemically before using so as to remove the pitch, resin, gum, etc. which would impede the action of the suphuric acid both on the cellulose and upon the lead; and also to remove the wood-acids which might otherwise injure the plates. Also when wood is employed as a source I preferably employ a species which contains a particularly large amount of cellulose as compared to the pitch and resin, e. g. oak, and avoid the conifers which contain an undue amount of the latter substances. Other sources can be utilized wherein more or less of these substances have been removed in manufacture, e. g. paper, filter-paper, cotton, rags.

In the performance of my said invention I preferably take a quantity of dry wood chips or shavings and digest for a time with ether or with a mixture of alcohol and benzene to dissolve the resinous parts. I then wash with alcohol, next with water, and boil with weak ammonia. I then wash with water, treat with dilute sulphuric acid, wash again with water, and dry. Regardless of the shape the substance originally had the process can be so conducted that the resulting product will consist of or contain a mass of small non-adherent bodies, representing approximately the cells of the wood. I preferably use a hard, slow-growing, small celled wood, such as oak or mahogany, and it is not necessary to continue the cleansing process sufficiently to remove the cell contents or even all the external adhesive.

If some wood is used which possesses too large a cell the same can be broken into pieces after the extraction process. It is desirable to employ such extracting reagents and temperatures that the resulting product will be non-adherent.

It is then mixed dry with the dry oxides, the mixture wetted with either water or with a sulphuric acid solution and applied to the grids in the usual manner, after which the latter are treated with sulphuric acid in the customary manner. The only purpose of drying the cellulose granules was to facilitate the mixing; if the pains are taken to mix the substances while wet the result will be the same. In fact the grains can be rubbed into the sides of the plates after they are pasted and before they are set, and a great increase of effective surface secured but with less convenience. The essential result is the same in all cases and is my invention.

The plate is now subjected to a stronger sulphuric acid solution, preferably having a specific gravity between 1.4 and 1.6 (e. g. 1.53). This has been found to have no injurious action on the plates but dissolves the cellulose without decomposition or carbonizing. Even the acid of the fully charged battery will remove the cellulose slowly and this without injuring the electrolyte.

I do not limit myself to cellulose alone since mixtures of the same with a certain percentage of inert gum is not fatal; nor do I exclude such compounds of the same as cellulose sulphate which can be employed in the granular form; nor do I exclude other carbohydrates which are insoluble in water yet removable by sulphuric acid to a strength which will not injure the plates.

The amount of substances used is very small, generally not over about 5% by volume or one tenth to one twentieth per cent by weight.

My improvements can be applied to both plates with excellent results but it is of greatest importance in connection with the negative plate. This is ordinarily made from litharge and in the operation of the battery alternates between the sulphate and the metallic condition. The great advantage of this added porosity is to facilitate the sulphating and unsulphating by increasing the surface of contact. Also the sulphate produced in the interior of the plate appears not to be so hard and physically resistant so that a plate prepared according to my improved process offers less tendency to become dead from over sulphation.

It will be understood that many changes in detail can be made within the scope of the annexed claims.

Having thus described my invention, what I claim is:

1. The process of making a plate for a storage battery which contains the step of incorporating the lead oxide paste prior to setting with a finely divided granular substance consisting of or containing essentially cellulose and afterwards gradually removing the cellulose by sulphuric acid.

2. The process of making a plate for a storage battery which contains the steps of treating finely divided wood with substances which will dissolve the pitch and remove the wood acids, mixing the resulting granular product with lead oxide, applying the wetted mixture to the frames or grids and afterward gradually removing the granular substance with sulphuric acid.

3. The process of making a plate for a storage battery which contains the steps of incorporating with the lead oxide paste a finely divided granular substance which is insoluble in water and soluble in sulphuric acid.

4. The process of making a plate for a storage battery which contains the steps of incorporating with the lead oxide paste a finely divided carbohydrate which is soluble in sulphuric acid and insoluble in water.

5. The process of making a plate for a storage battery which contains the steps of treating granulated wood dust with a fluid to extract the pitchy and resinous matters, mixing the resulting granulated product with a lead compound, and applying the plastic mixture to the frames or grids.

6. The process of making a plate for a storage battery which contains the steps of disintegrating wood scraps with a substance which dissolves the pitchy and resinous matters, mixing the residue with the oxides of which the plates are formed, and subsequently removing by sulphuric acid the parts which are soluble therein.

In testimony whereof, I hereunto affix my signature.

WILLIAM H. WOOD.

DISCLAIMER 1,432,937.—*William H. Wood*, Cleveland, Ohio. STORAGE BATTERY. Patent dated October 24, 1922. Disclaimer filed April 10, 1930, by the *patentee*.

Therefore enters the following disclaimer in relation to certain of said claims as follows:

Petitioner disclaims from the scope of claim 1 all processes involving the use of "finely divided granular substances consisting of or containing essentially cellulose" except those wherein the cellulose material has been digested in sulphuric acid prior to being incorporated with the lead oxide.

Petitioner disclaims from the scope of claim 2 all substances excepting those which, in addition to the other characteristics recited in that claim, have been digested with an alkali solution, and also, subsequently to such alkali solution, with sulphuric acid solution, before being mixed with the lead oxide.

Petitioner disclaims from the scope of claim 3 all processes involving the use of "a finely divided granular substance which is insoluble in water and soluble in sulphuric acid" except those wherein the substance in question is a vegetable substance such as sawdust, paper, cotton, or rags, containing a high proportion of cellulose and wherein that substance has been treated with plurality of liquids, one of said liquids being of a character to remove pitch, resin, and wood acids, and another of said liquids being sulphuric acid, the treatment with the sulphuric acid being the last treatment prior to the mixing of the substance with the lead oxide.

Petitioner disclaims from the scope of claim 4 all processes involving the use of "a finely divided carbohydrate which is soluble in sulphuric acid and insoluble in water" except those wherein the carbohydrate in question is essentially cellulose free from pitchy, resinous, and acid substances and wherein said carbohydrate has actually been digested with sulphuric acid prior to its incorporation with the lead oxide.

[*Official Gazette, May 6, 1930.*]